US008471405B2

(12) United States Patent
DiMarco et al.

(10) Patent No.: US 8,471,405 B2
(45) Date of Patent: Jun. 25, 2013

(54) HIGH EFFICIENCY STANDBY POWER GENERATION

(75) Inventors: Robert A DiMarco, Wappingers Falls, NY (US); Randhir S Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/794,019

(22) Filed: Jun. 4, 2010

(65) Prior Publication Data
US 2011/0298279 A1 Dec. 8, 2011

(51) Int. Cl.
*H02J 9/00* (2006.01)
(52) U.S. Cl.
USPC .............................................. 307/64; 307/82
(58) Field of Classification Search
USPC ...................................................... 307/82, 64
See application file for complete search history.

(56) References Cited

U.S. PATENT DOCUMENTS

| | | |
|---|---|---|
| 3,956,669 A | 5/1976 | Del Ciello |
| 6,151,224 A | 11/2000 | Lim et al. |
| 6,661,211 B1 * | 12/2003 | Currelly et al. ............... 323/268 |
| 6,768,224 B2 | 7/2004 | Shen et al. |
| 6,839,247 B1 | 1/2005 | Yang et al. |
| 7,039,755 B1 | 5/2006 | Helms |
| 7,200,013 B2 * | 4/2007 | Gan et al. ................... 363/21.04 |
| 7,276,887 B2 | 10/2007 | Miki et al. |
| 7,315,096 B2 | 1/2008 | Kuo |
| 7,408,270 B2 | 8/2008 | Durbaum et al. |
| 7,471,527 B2 | 12/2008 | Chen |
| 7,484,109 B2 | 1/2009 | Feldman et al. |
| 7,577,858 B2 | 8/2009 | Garg et al. |
| 7,944,090 B2 * | 5/2011 | Chang et al. ..................... 307/72 |
| 8,018,088 B2 * | 9/2011 | Dishman et al. ................ 307/17 |

* cited by examiner

*Primary Examiner* — Hal Kaplan
(74) *Attorney, Agent, or Firm* — Kunzler Law Group, PC (57) ABSTRACT

An apparatus, system, and method are disclosed for providing standby power. A switching module adjusts an on-time and an off-time of one or more switches based on a feedback signal. The one or more switches are shared between a primary stage and a standby stage of a switched-mode power supply. A shutoff module interrupts electric power flowing to the primary stage in response to a standby signal having a standby state and allows electric power to flow to the primary stage in response to the standby signal having an on state. A feedback module provides the feedback signal to the switching module. The feedback module bases the feedback signal on an output of the primary stage in response to the standby signal having the on state. The feedback module bases the feedback signal on an output of the standby stage in response to the standby signal having the standby state.

21 Claims, 7 Drawing Sheets

HIGH EFFICIENCY STANDBY POWER GENERATION

BACKGROUND

1. Field

The subject matter disclosed herein relates to electric power generation and more particularly relates to generation of standby electric power.

2. Description of the Related Art

Many electric devices incorporate a standby mode of operation. Standby modes usually use less power than normal operation and sometimes use different voltages. For example, a computing device or an electronic appliance may store data in volatile memory, keep time, or monitor user input when in a low power state. The low power state may use less power than normal operation of the computing device or electronic appliance, and the memory, time, or user input circuits may use different voltages than the standard voltages for the computing device or electronic appliance.

Using the same power supply for operation in a standby mode is often inefficient. Most power supplies are designed to operate efficiently under power loads consistent with normal use, and operate inefficiently under lower power loads experienced during a standby mode. Further, power supplies that provide several voltages often convert one voltage to the other voltages. If each of the several voltages is not used in a standby mode, some power supplies continue to provide each of the voltages, which can also be inefficient.

BRIEF SUMMARY

The present invention has been developed in response to the present state of the art, and in particular, in response to the problems and needs in the art that have not yet been fully solved by currently available power supplies. Accordingly, the present invention has been developed to provide an apparatus, system, and method for providing standby power that overcome many or all of the above-discussed shortcomings in the art.

The apparatus to provide standby power is provided with a plurality of modules configured to functionally execute the steps of providing standby power. These modules in the described embodiments include a switching module, a shutoff module, and a feedback module.

The switching module, in one embodiment, adjusts an on-time and an off-time of one or more switches for a primary stage and a standby stage of a switched-mode power supply. In one embodiment, the primary stage and the standby stage share the one or more switches. The primary stage, in another embodiment, includes one or more switched-mode power supply stages. The switching module, in a further embodiment, adjusts the on-time and the off-time based on a feedback signal.

The shutoff module, in one embodiment, interrupts electric power flowing to the primary stage in response to a standby signal having a standby state. In a further embodiment, the shutoff module allows electric power to flow to the primary stage, in response to the standby signal having an on state.

The feedback module, in one embodiment, provides the feedback signal to the switching module. In one embodiment, the feedback module bases the feedback signal on an output of the primary stage in response to the standby signal having the on state. In a further embodiment, the feedback module bases the feedback signal on an output of the standby stage in response to the standby signal having the standby state.

A system to provide standby power is also presented. The system, in the described embodiments, includes a switched-mode power supply, a switching module, a shutoff module, and a feedback module.

The switched-mode power supply, in one embodiment, includes a primary stage and a standby stage. The primary stage and the standby stage, in a further embodiment, share one or more switches. The primary stage, in another embodiment, includes one or more switched-mode power supply stages.

The switching module, in one embodiment, adjusts an on-time and an off-time of one or more switches for the primary stage and the standby stage of the switched-mode power supply. The switching module, in a further embodiment, adjusts the on-time and the off-time based on a feedback signal.

The shutoff module, in one embodiment, interrupts electric power flowing to the primary stage in response to a standby signal having a standby state. In a further embodiment, the shutoff module allows electric power to flow to the primary stage, in response to the standby signal having an on state.

The feedback module, in one embodiment, provides the feedback signal to the switching module. In one embodiment, the feedback module bases the feedback signal on an output of the primary stage in response to the standby signal having the on state. In another embodiment, the feedback module bases the feedback signal on an output of the standby stage in response to the standby signal having the standby state.

A method of the present invention is also presented to provide standby power. The method in the disclosed embodiments substantially includes the steps necessary to carry out the functions presented above with respect to the operation of the described apparatus and system. In one embodiment, the method includes adjusting an on-time and an off-time of one or more switches for a primary stage and a standby stage of a switched-mode power supply based on a feedback signal. The primary stage and the standby stage, in one embodiment, share the one or more switches. The primary stage, in a further embodiment, includes one or more switched-mode power supply stages.

The method, in one embodiment, includes interrupting electric power flowing to the primary stage in response to a standby signal having a standby state. In another embodiment, the method includes allowing electric power to flow to the primary stage in response to the standby signal having an on state.

The method, in a further embodiment, includes basing the feedback signal on an output of the primary stage in response to the standby signal having the on state. In one embodiment, the method includes basing the feedback signal on an output of the standby stage in response to the standby signal having the standby state.

Another apparatus to provide standby power is provided with a plurality of modules configured to functionally execute the necessary steps of providing standby power. These modules in the described embodiments include a switching module, a shutoff module, and a feedback module.

The switching module, in one embodiment, adjusts an on-time and an off-time of one or more switches for a primary stage and a standby stage of a switched-mode power supply. In one embodiment, the primary stage and the standby stage share the one or more switches. The primary stage, in another embodiment, includes one or more switched-mode power supply stages. The switching module, in a further embodiment, adjusts the on-time and the off-time based on a feedback signal.

The shutoff module, in one embodiment, interrupts electric power flowing to the primary stage in response to a standby signal having a standby state. In a further embodiment, the shutoff module allows electric power to flow to the primary stage, in response to the standby signal having an on state.

The feedback module, in one embodiment, provides the feedback signal to the switching module. In one embodiment, the feedback module bases the feedback signal on an output of the primary stage in response to the standby signal having the on state. In a further embodiment, the feedback module bases the feedback signal on an output of the standby stage in response to the standby signal having the standby state.

The primary stage and the standby stage, in one embodiment, are electrically coupled to a load. In a further embodiment, the primary stage provides electric power to the load and the load draws substantially no electric power from the standby stage in response to the shutoff module allowing electric power to flow to the primary stage. In another embodiment, the standby stage provides electric power to at least a portion of the load in response to the shutoff module interrupting electric power flowing to the primary stage.

In one embodiment, a winding ratio of a primary stage transformer in the primary stage and a winding ratio of a standby stage transformer in the standby stage are selected so that the output of the standby stage has a lower voltage than a standby setpoint voltage in response to the feedback module basing the feedback signal on the output of the primary stage. The standby setpoint voltage, in one embodiment, is a voltage that the output of the standby stage has in response to the feedback module basing the feedback signal on the output of the standby stage. The output of the standby stage, in a further embodiment, increases from the lower voltage to the standby setpoint voltage in response to the feedback module basing the feedback signal on the output of the standby stage.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments of the invention may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
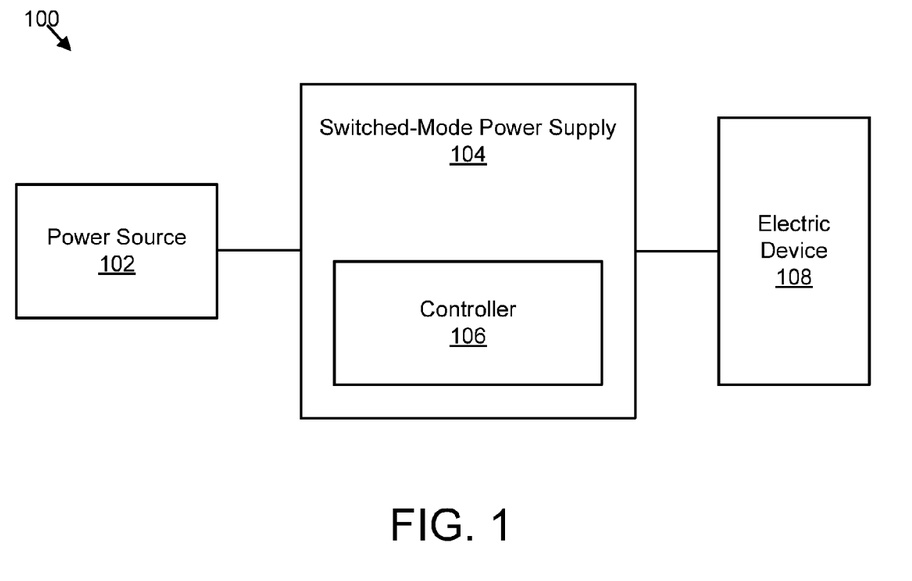
FIG. 1 is a schematic block diagram illustrating one embodiment of a system to provide standby power in accordance with the present invention.

FIG. 1 depicts one embodiment of a system 100 to provide standby power. In the depicted embodiment, the system 100 includes a power source 102, a switched-mode power supply 104 with a controller 106, and an electric device 108. The system 100, in one embodiment, provides power to the electric device 108 in at least a primary mode and a standby mode. In one embodiment, the system 100 provides a lower amount of power and/or a different set of voltages in the standby mode than in the primary mode. The system 100, in one embodiment, operates efficiently in both the standby mode and the primary mode.

In one embodiment, the power source 102 provides electric power to the switched-mode power supply 104. The power source 102 may include an alternating current ("AC") source or a direct current ("DC") source. The power source 102 may provide mains power from an electrical utility, may generate electric power, may convert electric power from another source to a form usable by the switched-mode power supply 104, may store electric power, or the like.

In one embodiment, the switched-mode power supply 104 receives electric power from the power source 102, converts the electric power to one or more other forms, and delivers the converted electric power to the electric device 108. The switched-mode power supply 104 includes at least one switched-mode power supply stage. In one embodiment, the switched-mode power supply 104 includes at least two stages, a primary stage and a standby stage. Each stage of the switched-mode power supply 104, in one embodiment, includes one or more switching regulators, rectifiers, filters, and/or other components.

The switched-mode power supply 104, in one embodiment, provides electric power from the primary stage to the electric device 108 during the primary mode and provides electric power from the standby stage to the electric device 108 during the standby mode. The electric device 108, in one embodiment, draws little or no electric power from the standby stage during the primary mode and the switched-mode power supply 104 shuts off the primary stage during the standby mode. The standby stage, in one embodiment, is powered during both the primary mode and the standby mode, but delivers substantially no electric power to the electric device 108 during the primary mode.

In one embodiment, the primary stage and the standby stage share one or more components, such as one or more switches, a pulse width modulator, an opto-coupler, and/or other components. Sharing components, in one embodiment, reduces costs of the switched-mode power supply 104. The switched-mode power supply 104 is described in greater detail below with regard to FIGS. 3-5.

In one embodiment, the controller 106 controls one or more functions of the switched-mode power supply 104. The controller 106, in one embodiment, controls on-times and off-times of one or more switches for switched-mode power supply stages of the switched-mode power supply 104 based on one or more feedback signals from outputs of the stages. The controller 106, in a further embodiment, uses a feedback signal from an output of the primary stage during the primary mode and a feedback signal from the standby stage during the standby mode. In another embodiment, the controller 106 interrupts electric power to the primary stage during the standby mode and allows electric power to flow to the primary stage during the primary mode.

The controller 106, in one embodiment, places the switched-mode power supply 104 into the standby mode and/or into the primary mode based on a standby signal. The controller 106, in one embodiment, generates the standby signal. In a further embodiment, the controller 106 receives the standby signal from the electric device 108, from a user input, from a software or hardware module, and/or from another source. For example, in one embodiment, the electric device 108 includes a computing device, and a motherboard of the electric device 108 delivers the standby signal to the controller 106.

In one embodiment, the switched-mode power supply 104 provides electric power to the electric device 108 in the form of one or more regulated DC voltages. The switched-mode power supply 104 may provide electric power with one voltage level to a portion of the electric device 108 and electric power with a different voltage level to a different portion of the electric device 108. The electric device 108, in one embodiment, includes one or more circuits that remain powered during the standby mode. For example, the electric device 108 may power a volatile memory circuit, time keeping circuit, a heartbeat circuit, a user input circuit, or the like during the standby mode. The electric device 108, in various embodiments, may include a computing device, such as a desktop computer, a laptop computer, a blade server, or the like, an appliance, a vehicle, a portable electronic device, or another electric load. In one embodiment, the switched-mode power supply 104 is integrated with the electric device 108 as a single unit.

Figure 2:
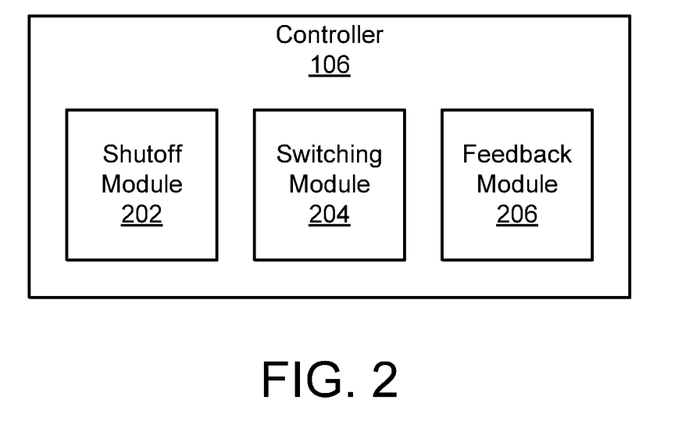
FIG. 2 is a schematic block diagram illustrating one embodiment of an apparatus to provide standby power in accordance with the present invention.

FIG. 2 depicts one embodiment of the controller 106. The controller 106, in one embodiment, is substantially similar to the controller 106 of FIG. 1. In the depicted embodiment, the controller 106 includes a shutoff module 202, a switching module 204, and a feedback module 206. In general, the controller 106 controls one or more functions of the switched-mode power supply 104. The controller 106, in various embodiments, may include one or more of an embedded controller within the switched-mode power supply 104, an application specific integrated circuit ("ASIC"), programmable logic, a processor, a computer readable storage medium, and/or other software or hardware elements. Although, in the depicted embodiment, the controller 106 and included modules are illustrated as a single unit, in a further embodiment, one or more of the modules may be disposed elsewhere in the switched-mode power supply 104, in the electric device 108, or the like.

The controller 106, in one embodiment, uses a standby signal to indicate that the switched-mode power supply 104 is transitioning between the primary mode and the standby mode. The controller 106, in one embodiment, generates the standby signal. In another embodiment, the controller 106 receives the standby signal from the electric device 108, from a user input, from a software or hardware module, and/or from another source. The standby signal, in one embodiment, has an on state, indicating that the switched-mode power supply 104 is operating in the primary mode, and a standby state, indicating that the switched-mode power supply 104 is operating in the standby mode. The standby signal, in various embodiments, may represent the primary state and the standby state as a high signal and a low signal, as a predefined indicator or command to transition or toggle between states, or the like. The standby signal may include a signal on a communications bus or other line, a value in a status register or other computer readable storage medium, and/or another indicator of a primary state or a standby state.

In one embodiment, the shutoff module 202 turns the primary stage on during the primary mode and off during the standby mode. To turn the primary stage on, in one embodiment, the shutoff module 202 allows electric power to flow to the primary stage in response to the standby signal having an on state. To turn the primary stage off, in one embodiment, the shutoff module 202 interrupts electric power flowing to the primary stage in response to the standby signal having the standby state. The shutoff module 202, in one embodiment, may include a switch, such as a relay, a transistor, or another switch, that is responsive to the standby signal, opening to interrupt electric power to the primary stage in response to the standby state and closing to allow electric power to the primary stage in response to the on state.

In one embodiment, the switching module 204 adjusts an on-time and an off-time of one or more switches for the primary stage and the standby stage of the switched-mode power supply 104. The primary stage and the standby stage, in one embodiment, share the one or more switches so that the same set of one or more switches performs the switching function for the switching regulators of the primary stage and the standby stage. In a further embodiment, the switching module 204 adjusts an on-time and an off-time of a single shared switch that performs the switching function for the switching regulators of the primary stage and the standby stage. The switching module 204, in one embodiment, adjusts the on-time and the off-time by driving the one or more switches with a pulse width modulated signal with a variable duty cycle that the switching module 204 adjusts.

The switching module 204, in one embodiment, adjusts the on-time and the off-time based on a feedback signal from the feedback module 206. For example, in one embodiment, the switching module 204 includes a comparator and a pulse width modulator. In the example, the comparator receives the feedback signal as an input, compares the feedback signal to a reference voltage, and outputs a difference signal to the pulse width modulator. The pulse width modulator, in the example embodiment, outputs a pulse width modulated signal to drive the one or more switches based on the difference signal.

In one embodiment, the feedback module 206 provides the feedback signal to the switching module 204. The feedback module 206, in one embodiment, bases the feedback signal on an output of the primary stage during the primary mode and bases the feedback signal on an output of the standby stage during the standby mode. For example, the feedback module 206, in one embodiment, bases the feedback signal on an output of the primary stage in response to the standby signal having the on state and bases the feedback signal on an output of the standby stage in response to the standby signal having the standby state.

The feedback module 206, in one embodiment, includes a multiplexer ("MUX") that receives the standby signal as a select line. Using the standby signal as a select line, the feedback module 206 selects an input corresponding to the output of the primary stage in response to the standby signal having the on state and selecting an input corresponding to the output of the standby stage in response to the standby signal having the standby state. In a further embodiment, the feedback module 206 includes another device that performs a multiplexing function, such as a controlled multiple input, single output switch or the like.

In one embodiment, the feedback module 206 scales the outputs of the primary stage and/or the standby stage to produce the feedback signal. The feedback module 206, in one embodiment, scales a voltage of the output of the primary stage with a primary scaling factor to produce the feedback signal during the primary mode. In a further embodiment, the feedback module 206 scales a voltage of the output of the standby stage with a standby scaling factor to produce the feedback signal during the standby mode. The feedback module 206 may scale the outputs using one or more voltage dividers, by converting the voltages of the outputs to digital signals and scaling the digital signals, or the like.

In one embodiment, the feedback module 206 scales the outputs from their target setpoint voltage levels to a level matching the reference voltage used by the switching module 204. The primary scaling factor, in one embodiment, is selected to maintain the voltage of the output of the primary stage at a primary setpoint voltage during the primary mode. The standby scaling factor, in one embodiment, is selected to maintain the voltage of the output of the standby stage at a standby setpoint voltage during the standby mode. The primary setpoint voltage is a target voltage for an output of the primary stage during primary mode and the standby setpoint voltage is a target voltage for an output of the standby stage during standby mode. In one embodiment, a winding ratio of a primary stage transformer in the primary stage and a winding ratio of a standby stage transformer in the standby stage are selected so that the output of the standby stage has a lower voltage than the standby setpoint voltage when the feedback module 206 bases the feedback signal on the output of the primary stage so that the electric device 108 or other load draws power from the primary stage instead of the standby stage in the primary mode.

Figure 3:
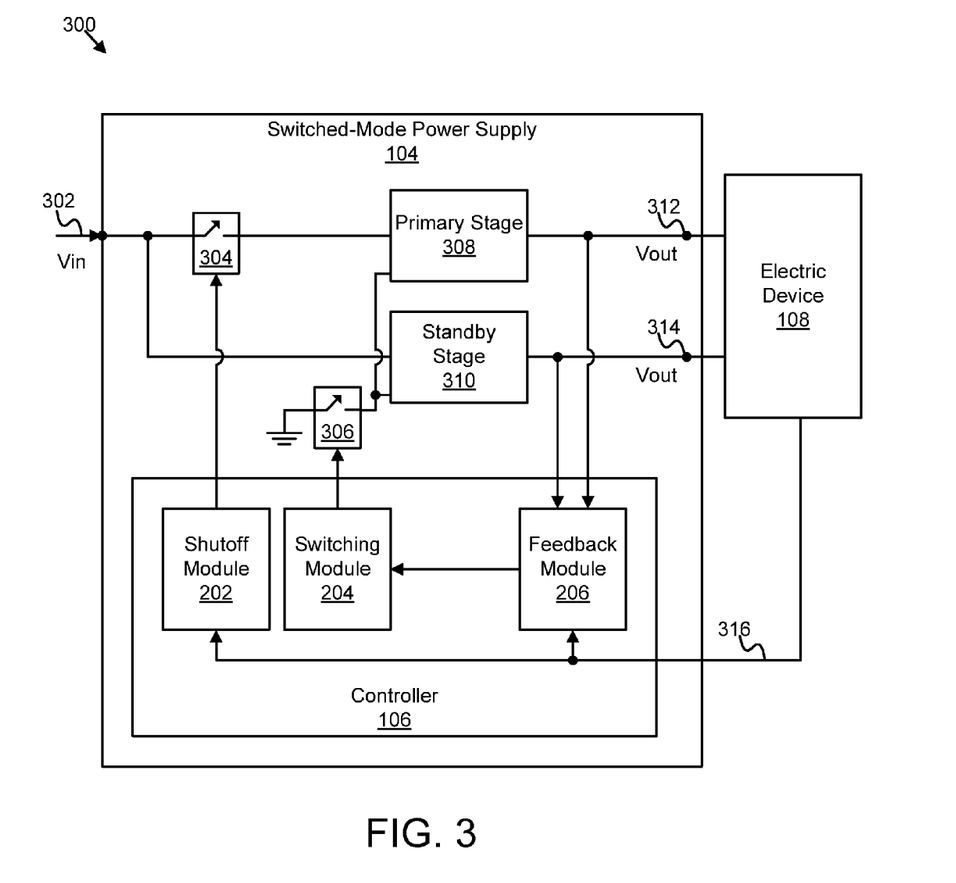
FIG. 3 is a schematic block diagram illustrating a further embodiment of a system to provide standby power in accordance with the present invention.

FIG. 3 depicts one embodiment of a system 300 to provide standby power. In the depicted embodiment, the system 300 includes the switched-mode power supply 104 with the controller 106 and the electric device 108. As depicted, the switched-mode power supply 104 includes a primary stage 308 and a standby stage 310. In a further embodiment, the system 300 may include the power source 102, one or more additional stages, rectifiers, filters, and/or other components. In the depicted embodiment, the electric device 108 provides the standby signal 316 to the controller 106. In a further embodiment, the controller 106 may generate the standby signal 316, a user input to a button, switch, or another user interface may provide the standby signal 316, another module may provide the standby signal 316, or the like.

In the depicted embodiment, the shutoff module 202 controls a standby switch 304 that is between a power supply input 302 and the primary stage 308. The shutoff module 202, in one embodiment, opens the standby switch 304 in response to the standby signal 316 having a standby state to interrupt the flow of electric power from the power supply input 302 to the primary stage 308 during standby mode. In a further embodiment, the shutoff module 202 closes the standby switch 304 in response to the standby signal 316 having an on state to allow electric power from the power supply input 302 to flow to the primary stage 308 during primary mode. The standby switch 304 may include a relay, a transistor, or another type of controlled switch. In one embodiment, the standby signal 316 directly controls the standby switch 304. For example, in one embodiment, the standby signal 316 is directly coupled to a control input of the standby switch 304, the on state closes the standby switch 304, and the standby state opens the standby switch 304.

In the depicted embodiment, the switching module 204 determines an on-time and an off-time for the power supply switch 306 based on a feedback signal from the feedback module 206. The primary stage 308 and the standby stage 310, in the depicted embodiment, share the power supply switch 306. The power supply switch 306, in one embodiment, includes a switching transistor or other switch that switches components of the primary stage 308 and the standby stage 310, such as transformers, inductors, capacitors, and the like, into and out of different electrical configurations. In a further embodiment, the power supply switch 306 has little or no resistance when closed and allows little or no current when open.

In the depicted embodiment, the power supply switch 306 is a single shared switch that provides a switching function for both the primary stage 308 and the standby stage 310. In a further embodiment, the power supply switch 306 may include several switches that provide switching functions for the primary stage 308 and/or the standby stage 310. In the depicted embodiment, the power supply switch 306 is disposed between one or more components of the primary stage 308 and the standby stage 310, such as a transformer winding, an inductor, or the like, and ground to interrupt switching circuits of the primary stage 308 and the standby stage 310. One of skill in the art, in light of this disclosure, will recognize other configurations and arrangements of the power supply switch 306, the primary stage 308, and the standby stage 310 that allow the power supply switch 306 to provide a switching function to both the primary stage 308 and the standby stage 310 as described herein.

In the depicted embodiment, the feedback module 206 receives an output of the primary stage 308, an output of the standby stage 310, and the standby signal 316 as inputs and outputs the feedback signal to the switching module 204. As described above relative to the feedback module 206 depicted in FIG. 2, the feedback module 206, in various embodiments, bases the feedback signal on an output of the primary stage 308 during primary mode, bases the feedback signal on an output of the standby stage 310 during standby mode, and the like.

In one embodiment, the primary stage 308 and the standby stage 310 each include one or more switched-mode power supply stages. The primary stage 308, in one embodiment, includes two or more switched-mode power supply stages that operate parallel and/or series configurations. For example, the primary stage 308 may include a first switched-mode power supply stage that converts electric power from the power supply input 302 to a first output voltage and may further include one or more additional switched-mode power supply stages that convert the first output voltage to other voltage levels and/or convert electric power from the power supply input 302 to other voltage levels.

In the depicted embodiment, the switched-mode power supply 104 includes a primary stage output 312 and a standby stage output 314 that provide electric power to the electric device 108. In a further embodiment, the switched-mode power supply 104 may include several primary stage outputs 312 and/or several standby stage outputs 314, from different stages of the primary stage 308 and/or the standby stage 310, or the like. In one embodiment, the primary stage output 312 and the standby stage output 314 each provide electric power with a different voltage. For example, in one embodiment, the primary stage output 312 and the standby stage output 314 may provide electric power to different portions of the electric device 108, such as separate circuits, separate loads, or the like. In one embodiment, the primary stage output 312 provides electric power to a load (within the electric device 108, or the like) during primary mode and the standby stage output 314 provides electric power to a subset of the load during standby mode. The subset of the load may have lower power requirements than the full load, different voltage and/or current requirements, or the like.

In one embodiment, at least one switched-mode power supply stage of the primary stage 308 provides electric power to the electric device 108 at the standby setpoint voltage level during primary mode. For example, one switched-mode power supply stage of the primary stage 308 may provide electric power to the electric device 108 at a primary voltage level (the primary setpoint voltage) and another switched-mode power supply stage of the primary stage 308 may provide electric power to the electric device 108 at a bias voltage level (the standby setpoint voltage level).

The primary stage output 312 corresponding to the standby setpoint voltage level, in one embodiment, is electrically coupled to the standby stage output 314. For example, the primary stage output 312 and the standby stage output 314 may be directly electrically coupled, electrically coupled using a diode ORing connection, electrically coupled using a transformer ORing connection, or the like. For example, in one embodiment, the primary stage output 312 may provide the primary setpoint voltage, which, in the example, may be 25 V, 12 V, or the like, and the standby stage output 314 may provide the standby setpoint voltage, which, in the example, may be 5 V, 3.3 V, or the like. In a further embodiment, in the example, the primary stage 308 may include a second output from a different stage that also provides the standby setpoint voltage of 5 V, 3.3 V, or the like. The second output of the primary stage 308, in one embodiment, may be electrically coupled to the standby stage output 314.

In one embodiment, the primary stage output 312 and the standby stage output 314 are electrically coupled together and the standby stage 310 provides electric power at a voltage level that is lower than the standby setpoint voltage during primary mode. In a further embodiment, at least one stage of the primary stage 308 provides electric power at the standby setpoint voltage during primary mode and the standby stage 310 provides electric power at a voltage level that is lower than the standby setpoint voltage during primary mode. Because the voltage of the standby stage output 314, in one embodiment, is lower than the electrically coupled primary stage output 312, the load receives electric power from the primary stage 308 and the load draws substantially no electric power from the standby stage 310 during primary mode.

In a further embodiment, the voltage level of the standby stage 310 recovers or increases to about the setpoint voltage level in response to the feedback module 206 basing the feedback signal on the standby stage output 314 during the standby mode. In one embodiment, a winding ratio of a primary stage transformer in the primary stage 308 and a winding ratio of a standby stage transformer in the standby stage 310 are selected so that the standby stage output 314 has a lower voltage than the standby setpoint voltage when the feedback module 206 bases the feedback signal on the primary stage output 312 during the primary mode. In one embodiment, during the primary mode, the voltage level of the standby stage output 314 follows the voltage level of the primary stage output 312 based on a relationship between the winding ratio of the primary stage transformer and the winding ratio of the standby stage transformer. In the standby mode, in one embodiment, the feedback module 206 bases the feedback signal on the standby stage output 314 and the voltage level of the standby stage output 314 no longer follows the voltage level of the primary stage output 312, but recovers or increases to the standby setpoint voltage.

In one embodiment, the electrical efficiency of the standby stage 310 is greater than the electrical efficiency of the primary stage 308 at the amount of electric power that the standby stage 310 provides in the standby mode. In a further embodiment, the electrical efficiency of the standby stage 310, at the amount of electric power that the standby stage 310 provides in the standby mode, is greater than the electrical efficiency of the stage of the primary stage 308 that provides the standby setpoint voltage, at the amount of electric power that the standby stage 310 provides in the standby mode. For example, one or more components of the primary stage 308, such as transformers, inductors, capacitors, and the like, in one embodiment, are sized to operate efficiently at an electric power level that the electric device 108 draws during primary mode, and one or more components of the standby stage 310 may be sized to operate efficiently at an electric power level that the electric device 108 draws during standby mode.

In one embodiment, the primary stage 308 and the standby stage 310 each have an efficiency curve, and the primary stage 308 operates at a level above the bend or knee of the efficiency curve of the primary stage 308 during primary mode. For example, in one embodiment, the primary stage 308 may operate at around about 80% efficiency or higher during primary mode, but if the primary stage 308 were to provide power during standby mode, lower power draws may lower efficiency of the primary stage 308 below 80% efficiency. The standby stage 310, in one embodiment, operates at a level above the bend or knee of the efficiency curve of the standby stage 310 during standby mode. For example, in one embodiment, the standby stage 310 may operate at around about 80% efficiency or higher during standby mode, but may not be capable of providing enough electric power to the electric device 108 during primary mode. In one embodiment, by providing electric power from the primary stage 308 during the primary mode and providing electric power form the standby stage 310 during the standby mode, the switched-mode power supply 104 operates efficiently in both the primary mode and the standby mode.

Figure 4:
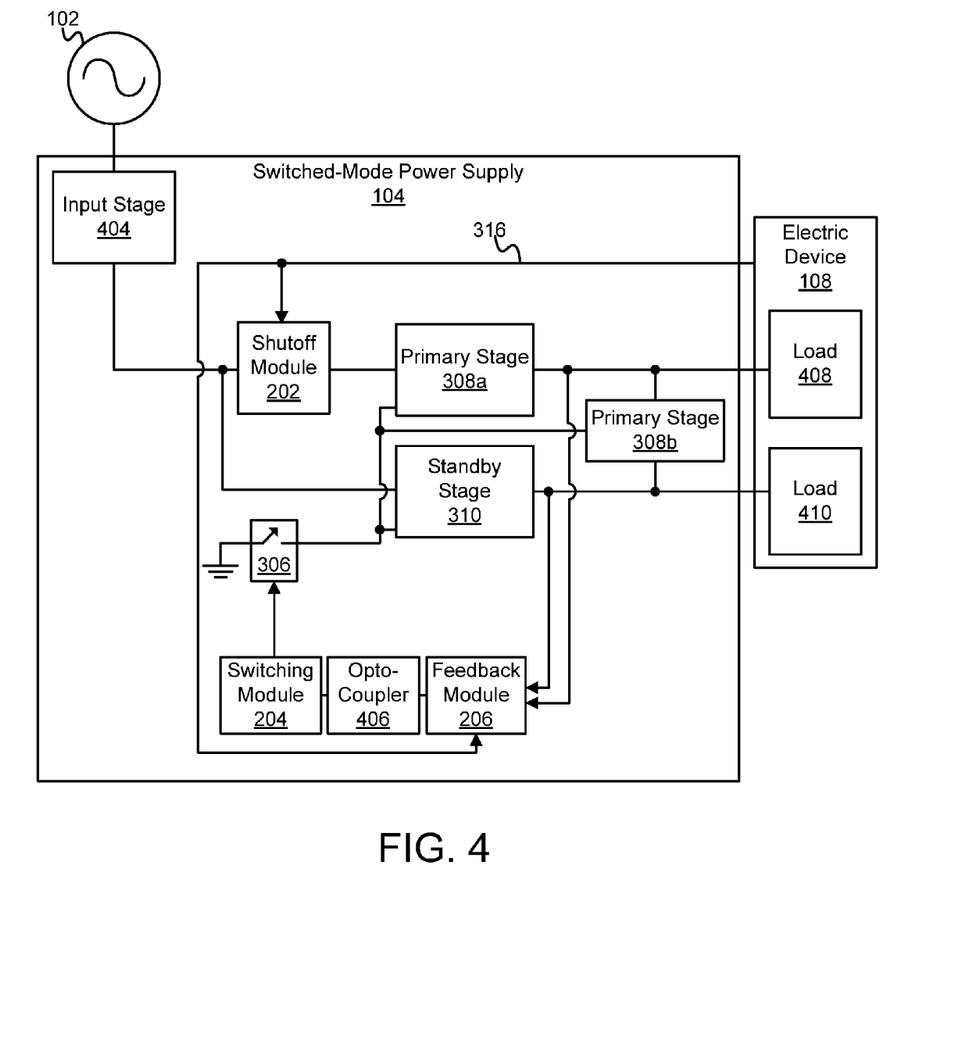
FIG. 4 is a schematic block diagram illustrating another embodiment of a system to provide standby power in accordance with the present invention.

FIG. 4 depicts one embodiment of a system 400 to provide standby power. In the depicted embodiment, the system 400 includes the power source 102, the switched-mode power supply 104, and the electric device 108. In the depicted embodiment, the power source 102 is an AC power source and the switched-mode power supply 104 includes an input stage 404 that converts the AC electric current from the power source 102 to DC electric current to provide electric power to the primary stage 308 and the standby stage 310. In one embodiment, the power source 102 is a mains power from an electrical utility that provides AC electric power at a standard voltage, such as 120 V, 200 V, 220 V, 230 V, 240 V, or another standard voltage.

The input stage 404, in various embodiments, may include one or more rectifiers, filters, switched-mode regulators, converters, and/or other components that convert AC electric current from the power source 102 into substantially DC electric current. In one embodiment, for example, the input stage 404 converts AC electric current from the power source 102 to about 380 V DC electric current. In one embodiment, the switching module 204 adjusts an on-time and an off-time for one or more switches of the input stage 404. The switching module 204, in a further embodiment, adjusts the on-time and the off-time for the one or more switches of the input stage 404 independently of the one or more shared switches of the primary stage 308 and the standby stage 310.

In the depicted embodiment, the primary stage 308 includes two switched-mode power supply stages, a first primary stage 308a and a second primary stage 308b. In the depicted embodiment, the first primary stage 308a and the second primary stage 308b are disposed in a series configuration, with the second primary stage 308b converting the output of the first primary stage 308a to a different voltage. In a further embodiment, the first primary stage 308a and the second primary stage 308b may be disposed in a parallel configuration, both converting input electric power to output voltages.

In the depicted embodiment, an output of the first primary stage 308a is coupled to an input of the second primary stage 308b and the output of the standby stage 310 is coupled to an output of the second primary stage 308b. In the depicted embodiment, the electric device 108 includes a first load 408 and a second load 410. The first primary stage 308a, in one embodiment, provides electric power at the primary setpoint voltage to the first load 408 during the primary mode. The second primary stage 308b, in one embodiment, converts the output of the first primary stage 308a from the primary setpoint voltage to the standby setpoint voltage and provides electric power to the second load 410 at the standby setpoint voltage during the primary mode.

In one embodiment, the standby stage 310 is on and powered during both the primary mode and the standby mode but the second load 410 draws substantially no power from the standby stage 310 during the primary mode. In the depicted embodiment, the output of the standby stage 310 is coupled to the output of the second primary stage 308b. The output of the standby stage 310 and the output of the second primary stage 308b, in various embodiments, may be directly electrically coupled, electrically coupled using a diode ORing connection, electrically coupled using a transformer ORing connection, or the like. In a further embodiment, the standby stage 310 is off during the primary mode and the shutoff module 202 interrupts a flow of electrical power to the standby stage 310 in response to the standby signal having the on state, or the like.

In one embodiment, the standby stage 310 provides electric power at a voltage level that is lower than the standby setpoint voltage provided by the second primary stage 308b during primary mode so that the second load 410 receives electric power from the second primary stage 308b and the second load 410 draws substantially no electric power from the standby stage 310 during primary mode. In a further embodiment, the voltage level of the standby stage 310 recovers or increases to about the setpoint voltage level in response to the feedback module 206 basing the feedback signal on the output of the standby stage 310 during the standby mode.

In one embodiment, a winding ratio of a primary stage transformer in the second primary stage 308b and a winding ratio of a standby stage transformer in the standby stage 310 are selected so that the output of the standby stage 310 has a lower voltage than the standby setpoint voltage and the output of the second primary stage 308b has about the standby setpoint voltage during the primary mode. In one embodiment, during the primary mode, the voltage level of the output of the standby stage 310 and a voltage level of the output of the second primary stage 308b follow a voltage level of the first primary stage 308a. In a further embodiment, the second primary stage 308b, instead of following the first primary stage 308a, may include separate power supply switches that receive a separate switching signal from the switching module 204, or the like.

In one embodiment, an amount of electric power that the second primary stage 308b provides to the second load 410 in response to the standby signal 316 having the on state is greater than an amount of electric power that the standby stage 310 provides to the second load 410 in response to the standby signal 316 having the standby state. For example, in one embodiment, a portion of the second load 410 may be shut down, disconnected, turned off, or the like during standby mode. In one embodiment, the electrical efficiency of the standby stage 310 is greater than the electrical efficiency of the second primary stage 308b at the amount of electric power that the standby stage 310 provides to the second load 410 in the standby mode, as described above with regard to the relative efficiencies of the primary stage 308 and the standby stage 310 illustrated in the embodiment of FIG. 3.

In the depicted embodiment, the switched-mode power supply 104 further includes an opto-coupler 406. The opto-coupler 406, as depicted, is disposed between the feedback module 206 and the switching module 204. In one embodiment, the opto-coupler 406 electrically isolates the switching module 204 from the output of the primary stage 308 and the output of the standby stage 310. In the depicted embodiment, the switched-mode power supply 104 includes a single opto-coupler 406 because the same feedback module 206, switching module 204, and one or more power supply switches 306 are shared between the primary stage 308 and the standby stage 310.

Figure 5:
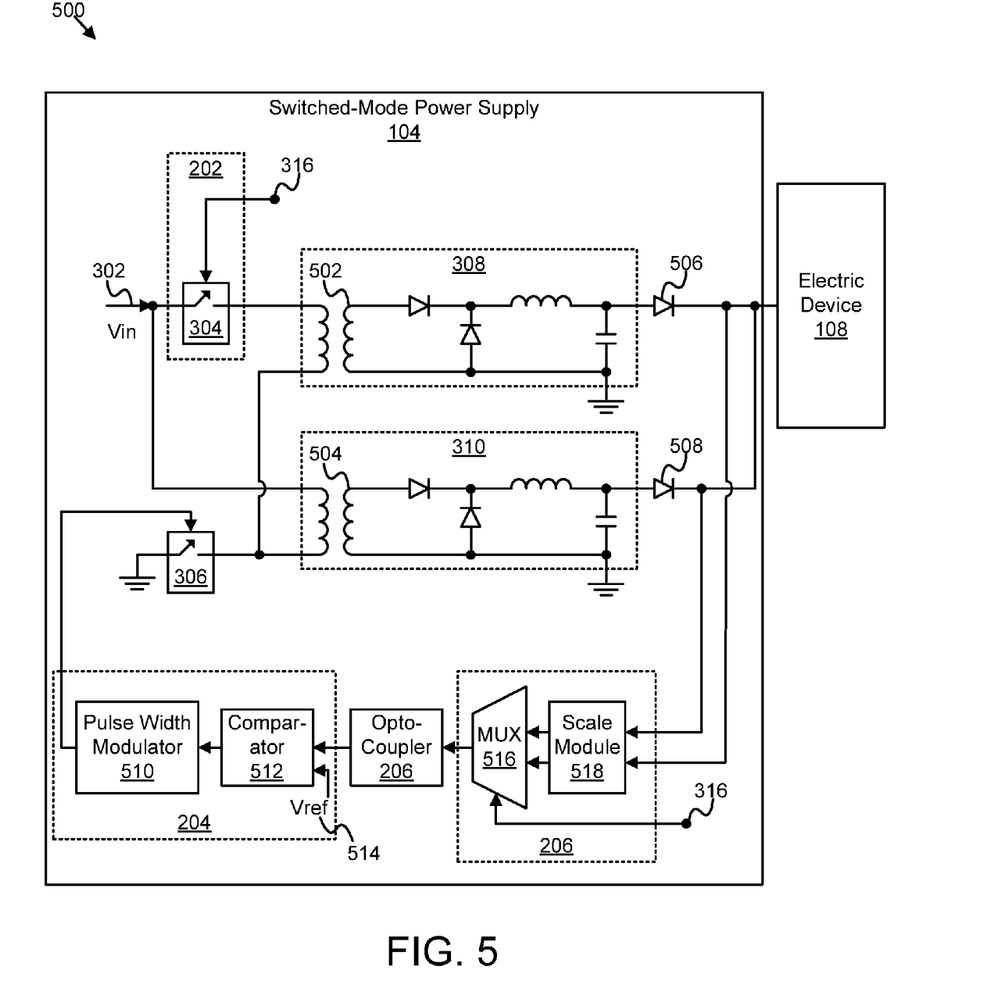
FIG. 5 is a schematic block diagram illustrating an additional embodiment of a system to provide standby power in accordance with the present invention.

FIG. 5 depicts one embodiment of a system 500 to provide standby power. In the depicted embodiment, the system 500 includes the switched-mode power supply 104 and the electric device 108. In the depicted embodiment, the switched-mode power supply 104 includes a single primary stage 308 and a single standby stage 310. In further embodiments, the primary stage 308 and/or the standby stage 310 may include several switched-mode power supply stages.

In the depicted embodiment, the primary stage 308 includes a primary stage transformer 502 and the standby stage 310 includes a standby stage transformer 504. Both the primary stage 308 and the standby stage 310 further include several switched-mode power supply components, such as diodes, inductors, capacitors, and the like to rectify and filter the electric power from the primary stage transformer 502 and the secondary stage transformer 504. One of skill in the art, in view of this disclosure, will recognize other topologies, configurations, and arrangements of switched-mode power supply components that may be used in the primary stage 308 and/or the standby stage 310 in accordance with the present invention.

In one embodiment, a winding ratio of the primary stage transformer 502 and a winding ratio of the standby stage transformer 504 are selected so that the output of the standby stage 310 has a lower voltage than the standby setpoint voltage when the feedback module 206 bases the feedback signal on the output of the primary stage 308. In the depicted embodiment, the output of the primary stage 308 is electrically coupled to the output of the standby stage 310. In one embodiment, the primary stage 308 provides electric power to the electric device 108 at the standby setpoint voltage during primary mode, and the electric device 108 draws substantially no electric power form the standby stage 310 because the voltage provided by the standby stage 310 is lower than the standby setpoint voltage during primary mode. The output of the standby stage 310, in one embodiment, has the standby setpoint voltage during the standby mode, when the feedback module 206 bases the feedback signal on the output of the standby stage 310 and the shutoff module 202 interrupts electric power flowing to the primary stage 308.

The switched-mode power supply 104, in the depicted embodiment, includes a primary protection diode 506 connecting the output of the primary stage 308 to the standby stage 310 and to the electric device 108. In the depicted embodiment, the switched-mode power supply 104 also includes a standby protection diode 508 connecting the output of the standby stage 310 to the primary stage 308 and to the electric device 108. The standby protection diode 508 prevents backflow of electric current to the standby stage 310 from the primary stage 308 and/or from the electric device 108. The primary protection diode 506 prevents backflow of electric current to the primary stage 308 from the standby stage 310 and/or from the electric device 108. The primary protection diode 506 and the standby protection diode 508, in the depicted embodiment, are ORing diodes that diode OR an output of the primary stage 308 to an output of the standby stage 310 to provide electric power to the electric device 108.

In a further embodiment, one or more switched-mode power supply components of the primary stage 308 and/or of the standby stage 310 may provide backflow current protection in place of or in conjunction with the primary protection diode 506 and/or the standby protection diode 508. In another embodiment, protection switches, resistors, fuses, circuit breakers, and/or other protection components may be used in place of or in conjunction with the primary protection diode 506 and/or the standby protection diode 508.

In the depicted embodiment, the feedback module 206 includes a scale module 518 and a MUX 516. The scale module 518, in one embodiment, scales a voltage of the output of the primary stage 308 with a primary scaling factor to produce the feedback signal during the primary mode, in response to the standby signal having the on state. The scale module 518, in another embodiment, scales a voltage of the output of the standby stage 310 with a standby scaling factor to produce the feedback signal during the standby mode, in response to the standby signal having the standby state.

As described above with regard to the feedback module 206 depicted in the embodiment of FIG. 2, in one embodiment, the primary scaling factor is selected to maintain the voltage of the output of the primary stage 308 at the primary setpoint voltage during the primary mode and the standby scaling factor is selected to maintain the voltage of the output of the standby stage 310 at the standby setpoint voltage during the standby mode. In one embodiment, the scale module 518 includes one or more voltage dividers that scale the voltage of the output of the primary stage 308 and the output of the standby stage 310. In a further embodiment, the scale module 518 may include an analog-to-digital converter that converts the voltage of the output of the primary stage 308 and the voltage of the output of the standby stage 310 to digital signals and the scale module 518 scales the digital signals. In one embodiment, the scale module 518 is integrated with the MUX 516.

The MUX 516, in one embodiment, receives the standby signal 316 as a select line that selects one of two inputs. In the depicted embodiment, the MUX 516 receives inputs from the scale module 518. In a further embodiment, the MUX 516 may receive inputs from the outputs of the primary stage 308 and the standby stage 310 directly, through one or more other modules or components, or the like. The MUX 516, in a further embodiment, selects an input corresponding to the output of the primary stage 308 in response to the standby signal 316 having the on state and selects an input corresponding to the output of the standby stage 310 in response to the standby signal 316 having the standby state.

In the depicted embodiment, the switching module 204 includes a comparator 512 and a pulse width modulator 510. In the depicted embodiment, the comparator 512 receives the feedback signal and a reference voltage 514 as inputs. In a further embodiment, the feedback signal may be digital, and the reference voltage 514 may be a stored digital value, or the like. The comparator 512, in one embodiment, compares the feedback signal to the reference voltage 514 and outputs a difference signal to the pulse width modulator 510.

The pulse width modulator 510, in the depicted embodiment, outputs a pulse width modulated signal to drive the power supply switch 306 based on the difference signal. The pulse width modulator 510, in one embodiment, adjusts the duty cycle, i.e. the on-time and the off-time, of the pulse width modulated signal based on the difference signal. For example, in one embodiment, the pulse width modulator 510 may increase the on-time and decrease the off-time of the pulse width modulated signal in response to a positive difference signal and vice versa for a negative difference, or the like. The direction and amount of adjustment that the pulse width modulator 510 makes to the pulse width modulated signal, in one embodiment, may depend on characteristics of the power supply switch 306, the feedback module 206, and/or the comparator 512.

Figure 6:
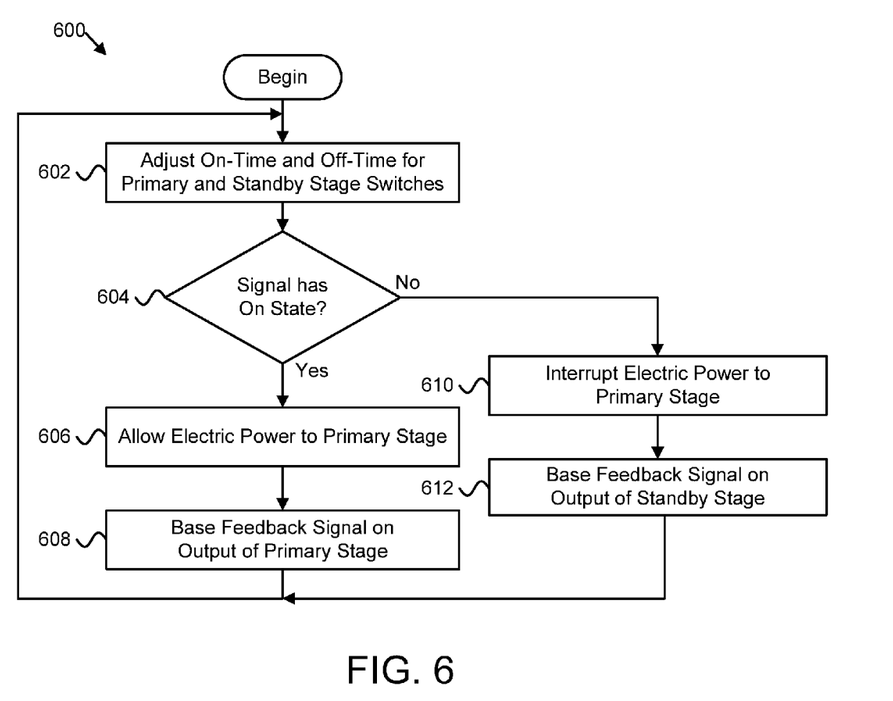
FIG. 6 is a schematic flow chart diagram illustrating one embodiment of a method for providing standby power in accordance with the present invention.

FIG. 6 depicts one embodiment of a method 600 for providing standby power. In the depicted embodiment, the method 600 begins and the switching module 204 adjusts 602 an on-time and an off-time of one or more switches 306 shared by the primary stage 308 and the standby stage 310 of the switched-mode power supply 104. The switching module 204, in one embodiment, adjusts 602 the on-time and the off-time based on a feedback signal. In one embodiment, the switching module 204 continues to adjust 602 the on-time and the off-time throughout the method 600.

The controller 106, the feedback module 206, and/or the shutoff module 202 determine 604 whether the standby signal 316 has an on state or a standby state. If the standby signal 316 has an on state, the switched-mode power supply 104 is in the primary mode, the shutoff module 202 allows 606 electric power to flow to the primary stage 308, and the feedback module 206 bases 608 the feedback signal on an output of the primary stage 308. If the standby signal 316 has a standby state, the switched-mode power supply 104 is in the standby mode, the shutoff module 202 interrupts 610 electric power flowing to the primary stage 308, and the feedback module 206 bases 612 the feedback signal on an output of the standby stage 310. The method 600 returns to the adjusting step 602 and the method 600 continues.

Figure 7:
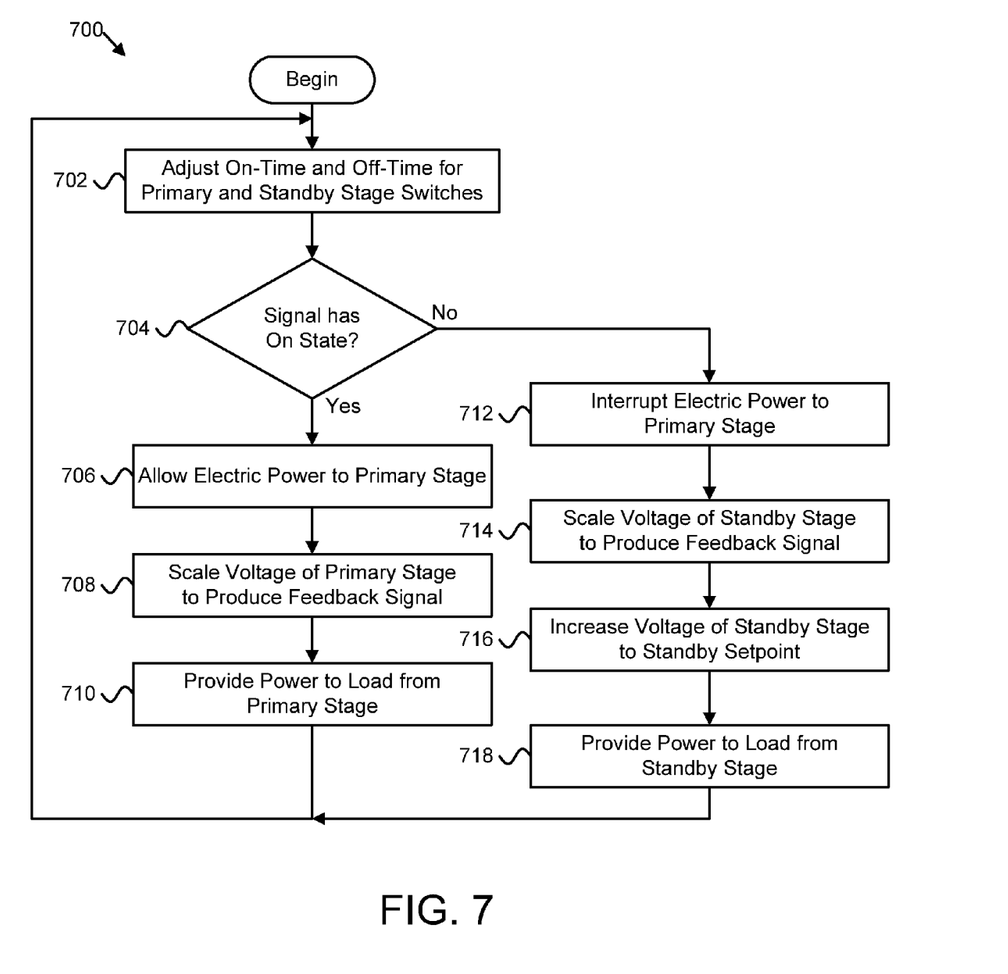
FIG. 7 is a schematic flow chart diagram illustrating another embodiment of a method for providing standby power in accordance with the present invention.

FIG. 7 depicts another embodiment of a method 700 for providing standby power. In the depicted embodiment, the method 700 begins and the switching module 204 adjusts 702 an on-time and an off-time of one or more switches 306 shared by the primary stage 308 and the standby stage 310 of the switched-mode power supply 104. The switching module 204, in one embodiment, adjusts 702 the on-time and the off-time based on a feedback signal. In one embodiment, the switching module 204 continues to adjust 702 the on-time and the off-time throughout the method 700.

The controller 106, the feedback module 206, and/or the shutoff module 202 determine 704 whether the standby signal 316 has an on state or a standby state. If the standby signal 316 has an on state, the switched-mode power supply 104 is in the primary mode and the shutoff module 202 allows 706 electric power to flow to the primary stage 308. The scale module 518 of the feedback module 206 scales 708 an output voltage of the primary stage 308 to form the feedback signal. The switched-mode power supply 104 provides 710 electric power to the electric device 108, or to another load, from the primary stage 308. In one embodiment, the electric device 108 or other load draws substantially no power from the standby stage 310. The method 700 returns to the adjusting step 702 and the method 700 continues.

If the standby signal 316 has a standby state, the switched-mode power supply 104 is in the standby mode and the shutoff module 202 interrupts 712 electric power flowing to the primary stage 308. The scale module 518 of the feedback module 206 scales 714 a voltage of the standby stage 310 to form the feedback signal. The standby stage 310 increases 716 an output voltage of the standby stage 310 in response to the feedback module 206 scaling 714 the voltage of the standby stage 310 to form the feedback signal. The switched-mode power supply 104 provides 718 electric power to the electric device 108, or to another load, from the standby stage 310. The method 700 returns to the adjusting step 702 and the method 700 continues.

Embodiments of the present invention may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "has," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus to provide standby power, the apparatus comprising:
   a switching module that adjusts an on-time and an off-time of one or more switches for a primary stage and a standby stage of a switched-mode power supply, the switching module adjusting the on-time and the off-time based on a feedback signal, the primary stage and the standby stage sharing the one or more switches, the primary stage comprising one or more switched-mode power supply stages;

a shutoff module that, in response to a standby signal having a standby state, interrupts electric power flowing to the primary stage and, in response to the standby signal having an on state, allows electric power to flow to the primary stage, wherein the primary stage and the standby stage are electrically coupled to a load such that the primary stage provides electric power to the load and the load draws substantially no electric power from the standby stage in response to the shutoff module allowing electric power to flow to the primary stage and such that the standby stage provides electric power to at least a portion of the load in response to the shutoff module interrupting electric power flowing to the primary stage; and a feedback module that provides the feedback signal to the switching module, the feedback module basing the feedback signal on an output of the primary stage in response to the standby signal having the on state and the feedback module basing the feedback signal on an output of the standby stage in response to the standby signal having the standby state, wherein a winding ratio of a primary stage transformer in the primary stage and a winding ratio of a standby stage transformer in the standby stage are selected such that the output of the standby stage, in response to the feedback module basing the feedback signal on the output of the primary stage, has a lower voltage than a standby setpoint voltage that the output of the standby stage has in response to the feedback module basing the feedback signal on the output of the standby stage, and wherein the feedback module scales a voltage of the output of the primary stage with a primary scaling factor to produce the feedback signal in response to the standby signal having the on state and the feedback module scales a voltage of the output of the standby stage with a standby scaling factor to produce the feedback signal in response to the standby signal having the standby state.

2. The apparatus of 1, wherein the output of the standby stage increases from the lower voltage to the standby setpoint voltage in response to the feedback module basing the feedback signal on the output of the standby stage.

3. The apparatus of claim 1, wherein at least one switched-mode power supply stage of the primary stage delivers electric power to the load at the standby setpoint voltage in response to the feedback module basing the feedback signal on the output of the primary stage.

4. The apparatus of claim 1, wherein the primary scaling factor is selected to maintain the voltage of the output of the primary stage at a primary setpoint voltage in response to the standby signal having the on state and the standby scaling factor is selected to maintain the voltage of the output of the standby stage at the standby setpoint voltage in response to the standby signal having the standby state.

5. The apparatus of claim 1, wherein the feedback module scales the voltage of the output of the primary stage and scales the voltage of the output of the standby stage using one or more voltage dividers.

6. The apparatus of claim 1, wherein the feedback module scales the voltage of the output of the primary stage and scales the voltage of the output of the standby stage by converting the voltage of the output of the primary stage and the voltage of the output of the standby stage to digital signals and scaling the digital signals.

7. The apparatus of claim 1, further comprising at least one diode connecting the standby stage to the load, the at least one diode preventing backflow of electric current to the standby stage from the primary stage.

8. The apparatus of claim 1, wherein the primary stage comprises two or more switched-mode power supply stages operating in at least one of a parallel and a series configuration.

9. The apparatus of claim 1, wherein the feedback module comprises a multiplexer ("MUX") that receives the standby signal as a select line, the feedback module selecting an input corresponding to the output of the primary stage in response to the standby signal having the on state and selecting an input corresponding to the output of the standby stage in response to the standby signal having the standby state.

10. The apparatus of claim 1, wherein the switching module comprises a comparator and a pulse width modulator, the comparator receiving the feedback signal as an input, comparing the feedback signal to a reference voltage, and outputting a difference signal to the pulse width modulator, the pulse width modulator outputting a pulse width modulated signal to drive the one or more switches, the pulse width modulator basing the pulse width modulated signal on the difference signal.

11. The apparatus of claim 1, wherein an amount of electric power that the primary stage provides in response to the standby signal having the on state is greater than an amount of electric power that the standby stage provides in response to the standby signal having the standby state.

12. The apparatus of claim 11, wherein an electrical efficiency of the standby stage is greater than an electrical efficiency of the primary stage at the amount of electric power that the standby stage provides in response to the standby signal having the standby state.

13. A system to provide standby power, the system comprising:

a switched-mode power supply comprising a primary stage and a standby stage, the primary stage and the standby stage sharing one or more switches, the primary stage comprising one or more switched-mode power supply stages;

a switching module that adjusts an on-time and an off-time of the one or more switches for the primary stage and the standby stage of the switched-mode power supply, the switching module adjusting the on-time and the off-time based on a feedback signal;

a shutoff module that, in response to a standby signal having a standby state, interrupts electric power flowing to the primary stage and, in response to the standby signal having an on state, allows electric power to flow to the primary stage, wherein the primary stage and the standby stage are electrically coupled to a load such that the primary stage provides electric power to the load and the load draws substantially no electric power from the standby stage in response to the shutoff module allowing electric power to flow to the primary stage and such that the standby stage provides electric power to at least a portion of the load in response to the shutoff module interrupting electric power flowing to the primary stage; and a feedback module that provides the feedback signal to the switching module, the feedback module basing the feedback signal on an output of the primary stage in response to the standby signal having the on state and the feedback module basing the feedback signal on an output of the standby stage in response to the standby signal having the standby state, wherein a winding ratio of a primary stage transformer in the primary stage and a winding ratio of a standby stage transformer in the standby stage are selected such that the output of the standby stage, in response to the feedback module basing the feedback signal on the output of the primary stage, has a lower voltage than a standby setpoint voltage that the output of the standby stage has in response to the feedback module basing the feedback signal on the output of the standby stage, and wherein the feedback module scales a voltage of the output of the primary stage with a primary scaling factor to produce the feedback signal in response to the standby signal having the on state and the feedback module scales a voltage of the output of the standby stage with a standby scaling factor to produce the feedback signal in response to the standby signal having the standby state.

14. The system of claim 13, wherein the load comprises an electric device electrically coupled to the switched-mode power supply.

15. The system of claim 14, wherein the electric device is selected from the group consisting of a computing device and a blade server.

16. The system of claim 13, further comprising an opto-coupler disposed between the feedback module and the switching module, the opto-coupler electrically isolating the switching module from the output of the primary stage and the output of the standby stage.

17. The system of claim 13, further comprising an input stage of the switched-mode power supply that converts an alternating current ("AC") input to direct current ("DC") electric current, the DC electric current providing electric power to the primary stage and the standby stage.

18. A method to provide standby power, the method comprising:
    adjusting an on-time and an off-time of one or more switches for a primary stage and a standby stage of a switched-mode power supply based on a feedback signal, the primary stage and the standby stage sharing the one or more switches, the primary stage comprising one or more switched-mode power supply stages;
    interrupting electric power flowing to the primary stage in response to a standby signal having a standby state;
    allowing electric power to flow to the primary stage in response to the standby signal having an on state;
    basing the feedback signal on an output of the primary stage in response to the standby signal having the on state; and
    basing the feedback signal on an output of the standby stage in response to the standby signal having the standby state; and
    scaling a voltage of the output of the primary stage with a primary scaling factor to produce the feedback signal in response to the standby signal having the on state and scaling a voltage of the output of the standby stage with a standby scaling factor to produce the feedback signal in response to the standby signal having the standby state.

19. The method of claim 18, further comprising providing electric power to a load from the primary stage, the load drawing substantially no electric power from the standby stage, in response to allowing electric power to flow to the primary stage and providing electric power to at least a portion of the load from the standby stage in response to interrupting electric power flowing to the primary stage.

20. The method of claim 19, further comprising increasing a voltage of the output of the standby stage from a lower voltage to a standby setpoint voltage in response to the feedback module basing the feedback signal on the output of the standby stage.

21. An apparatus to provide backup power, the apparatus comprising:
    a switching module that adjusts an on-time and an off-time of one or more switches for a primary stage and a standby stage of a switched-mode power supply, the switching module adjusting the on-time and the off-time based on a feedback signal, the primary stage and the standby stage sharing the one or more switches, the primary stage comprising one or more switched-mode power supply stages;
    a shutoff module that, in response to a standby signal having a standby state, interrupts electric power flowing to the primary stage and, in response to the standby signal having an on state, allows electric power to flow to the primary stage;
    a feedback module that provides the feedback signal to the switching module, the feedback module basing the feedback signal on the output of the primary stage in response to the standby signal having the on state and the feedback module basing the feedback signal on the output of the standby stage in response to the standby signal having the standby state;
    wherein the primary stage and the standby stage are electrically coupled to a load such that the primary stage provides electric power to the load and the load draws substantially no electric power from the standby stage in response to the shutoff module allowing electric power to flow to the primary stage and such that the standby stage provides electric power to at least a portion of the load in response to the shutoff module interrupting electric power flowing to the primary stage; and
    wherein a winding ratio of a primary stage transformer in the primary stage and a winding ratio of a standby stage transformer in the standby stage are selected such that the output of the standby stage, in response to the feedback module basing the feedback signal on the output of the primary stage, has a lower voltage than a standby setpoint voltage that the output of the standby stage has in response to the feedback module basing the feedback signal on the output of the standby stage, the output of the standby stage increasing from the lower voltage to the standby setpoint voltage in response to the feedback module basing the feedback signal on the output of the standby stage, and wherein the feedback module scales a voltage of the output of the primary stage with a primary scaling factor to produce the feedback signal in response to the standby signal having the on state and the feedback module scales a voltage of the output of the standby stage with a standby scaling factor to produce the feedback signal in response to the standby signal having the standby state.

* * * * *